(12) United States Patent
Mezer

(10) Patent No.: US 7,567,517 B2
(45) Date of Patent: Jul. 28, 2009

(54) PERFORMING CHANNEL ANALYSIS OVER A LINK

(75) Inventor: Amir Mezer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 10/853,297

(22) Filed: May 25, 2004

(65) Prior Publication Data

US 2005/0276225 A1 Dec. 15, 2005

(51) Int. Cl.
*G01R 31/08* (2006.01)
(52) U.S. Cl. ............... 370/241; 370/282; 370/463; 370/461; 370/469
(58) Field of Classification Search .......... 370/241, 370/282, 463, 642, 461, 469
See application file for complete search history.

(56) References Cited

U.S. PATENT DOCUMENTS

| | | | |
|---|---|---|---|
| 4,740,992 A | 4/1988 | Havens et al. | 375/219 |
| 4,910,507 A | 3/1990 | Shimizu et al. | 370/419 |
| 4,968,978 A | 11/1990 | Stolarczyk et al. | 340/854.6 |
| 5,241,542 A | 8/1993 | Natarajan et al. | 370/311 |
| 5,790,057 A | 8/1998 | Linde et al. | 341/68 |
| 6,278,864 B1 | 8/2001 | Cummins et al. | 455/73 |
| 6,445,733 B1 * | 9/2002 | Zuranski et al. | 375/231 |
| 6,504,849 B1 * | 1/2003 | Wang et al. | 370/455 |
| 6,662,332 B1 * | 12/2003 | Kimmitt | 714/762 |
| 6,718,417 B1 | 4/2004 | Bachrach | 710/305 |
| 6,813,729 B1 * | 11/2004 | Tsang et al. | 714/43 |
| 6,862,674 B2 | 3/2005 | Dice et al. | 711/170 |
| 6,937,571 B1 * | 8/2005 | Acharya et al. | 370/246 |
| 6,968,158 B1 | 11/2005 | Bhute et al. | 455/68 |
| 7,068,611 B2 * | 6/2006 | Bui | 370/252 |
| 7,120,557 B2 * | 10/2006 | Schmitz et al. | 702/183 |
| 2001/0035994 A1 | 11/2001 | Agazzi et al. | 398/135 |
| 2002/0080792 A1 | 6/2002 | Rosier | 370/394 |
| 2002/0132603 A1 | 9/2002 | Lindskog et al. | 455/343.4 |
| 2003/0165152 A1 | 9/2003 | Mills et al. | 370/422 |

(Continued)

FOREIGN PATENT DOCUMENTS

FR 2813624 A1 4/2000

(Continued)

OTHER PUBLICATIONS

"Intel® 82547EI Gigabit Ethernet Controller: Product Brief." Intel in Communications, Copyright 2003, Intel Corporation. ftp://download.intel.com/design/network/ProdBrf/25245701.pdf.

(Continued)

*Primary Examiner*—Ricky Ngo
*Assistant Examiner*—Kibrom T Hailu
(74) *Attorney, Agent, or Firm*—Trop, Pruner & Hu, P.C.

(57) ABSTRACT

In one embodiment of the present invention, a method includes establishing a communication link between a first link partner and a second link partner, causing the first link partner to transmit idle signals, and analyzing a desired channel of the communication link using the idle signals. As an example, the communication link may be an Ethernet link and the link may be maintained during the channel analysis so that system data transmissions may be resumed or initiated immediately after the analysis is completed.

23 Claims, 5 Drawing Sheets

U.S. PATENT DOCUMENTS

| | | | |
|---|---|---|---|
| 2004/0008736 A1 | 1/2004 | Bae et al. | 370/528 |
| 2004/0034486 A1* | 2/2004 | Iannuzzi | 702/66 |
| 2004/0228275 A1 | 11/2004 | Costo et al. | 370/230 |
| 2004/0258085 A1* | 12/2004 | Costo | 370/445 |

FOREIGN PATENT DOCUMENTS

| | | |
|---|---|---|
| WO | 0514583 A1 | 8/1991 |
| WO | WO 93/08360 | 10/1991 |
| WO | WO 95/18710 | 11/1994 |

OTHER PUBLICATIONS

"Intel® 82547GI/82547EI Gigabit Ethernet Controller-Networking Silicon: Datasheet". Revision 2.0, Aug. 2003. ftp://download.intel.com/design/network/datashts/82547gi_ei_ds.pdf.

"10 Gigabit Ethernet Technology Overview White Paper" Revision 2, Draft A. Apr. 2002. http://www.10gea.org/10GEA%20White%20Paper_0502.pdf.

IEEE, "Part 11: Wireless LAN Medium Access Control (MAC) and Physical Layer (PHY) Specifications" IEEE Standard, Jun. 26, 1997, pp. 34-59 and 100-137.

\* cited by examiner

PERFORMING CHANNEL ANALYSIS OVER A LINK

BACKGROUND

Ethernet local area networks are in wide use today. The term Ethernet is often used to refer to carrier sense multiple access/collision detection (CSMA/CD) local area networks (LANs) that generally conform to Ethernet specifications, including the Institute of Electrical and Electronics Engineers (IEEE) 802.3 standard (published Jul. 29, 1996).

Basic Ethernet transmission, such as 10 Base-T, is capable of a data transmission rate of 10 Megabits per second (Mbps). The need for greater data rates has led to the development of "Fast Ethernet" and "Gigabit Ethernet" technology that transmits data at rates up to 1 gigabits per second (Gbps). At such high speeds, link integrity is very important and as a result, it is desirable to analyze channels that form the link. However, such analysis typically requires inducing loss of the link itself.

Thus after channel analysis, set-up processes for the link must again be performed. Such processes include autonegotiation, which is a mechanism specified in the IEEE 802.3 standard in which network entities at either end of a link segment automatically determine the data rate at which the link segment will operate. Using autonegotiation, each network entity compares what Ethernet implementation it supports to what implementation the network entity at the other end supports. Such an autonegotiation process and other set-up processes such as link convergence are expensive to perform. Thus a need exists to analyze channels without link loss.

DETAILED DESCRIPTION

In certain embodiments, a communication link may be established between link partners and one or more channels therebetween may be tested without link loss. In such manner, various protocol requirements, such as autonegotiation and a convergence process, may be avoided. In certain embodiments, the link partners may be instructed to not transmit data during a period of acquisition of data for use in the channel analysis. However, when such data acquisition is completed, normal operation may continue without requiring configuration processes to occur again.

Figure 1:
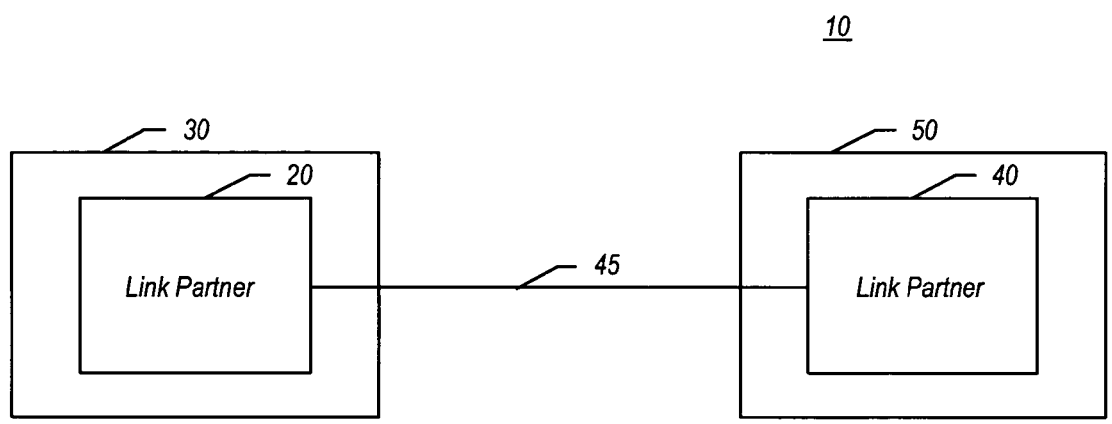
FIG. 1 is a block diagram of a portion of a network in accordance with one embodiment of the present invention.

Referring to FIG. 1, shown is a block diagram of a portion of a network in accordance with one embodiment of the present invention. As shown in FIG. 1, network 10 includes a first information handling system 30 coupled to a second information handling system 50 via a link 45. As examples, in certain embodiments, information handling system 30 may be a desktop computer, notebook computer, server computer or the like, and second information handling system 50 may be a similar such system, although the scope of the present invention is not so limited. In certain embodiments, network 10 may include an appropriate combination of additional high-speed (10 Gbps, for example) and low-speed (100 Mbps, for example) Ethernet components. The network topology may be a ring, star, or other configuration in which link 45 is a dedicated link between systems 30 and 50. While discussed largely in the context of an Ethernet LAN, the scope of the invention is not so limited. While not shown in FIG. 1, other components of network 10 may include buses (e.g., Ethernet buses), network interconnect devices such as a router, Ethernet switch, hubs, and data terminal equipment (DTE) network devices, such as workstations, file servers and databases.

Link 45 which, in some embodiments, may be a copper link, such as a category 5(CAT 5) or other such cable device, optical fiber or the like may couple system 30 and system 50. Thus, data may be transferred between system 30 and system 50 via link 45, which may be an Ethernet connection that permits data transfer at high speeds, for example, at gigabit speeds such as 1 or 10 Gbps or greater.

Also shown in FIG. 1, system 30 includes a link partner 20 which may be, for example, an Ethernet controller to adapt data packets from one or more protocols within system 30 for transmission on link 45 using an Ethernet protocol. For example, link partner 20 may include an interface to a bus of information handling system 30, for example, a peripheral component interconnect (PCI) bus in accordance with the Conventional PCI Specification, Revision 3.0 (published Apr. 19, 2004). In certain embodiments, link partner 20 may include medium access control (MAC) functionality to provide communication of data packets through a medium independent interface (MII). From there, data packets may be modulated and coded using a physical (PHY) layer unit to provide electromagnetic signals for propagation along link 45. A similar link partner 40 may be present in information handling system 50 that operates in the same manner.

While discussed herein in various embodiments as being a link partner that is an Ethernet controller using an Ethernet protocol, it is to be understood that the scope of the present invention is not so limited. Further, the components described above as being part of link partner 20 may take different forms, and may be a part of a single semiconductor device, or may be segmented among multiple such devices.

Figure 2:
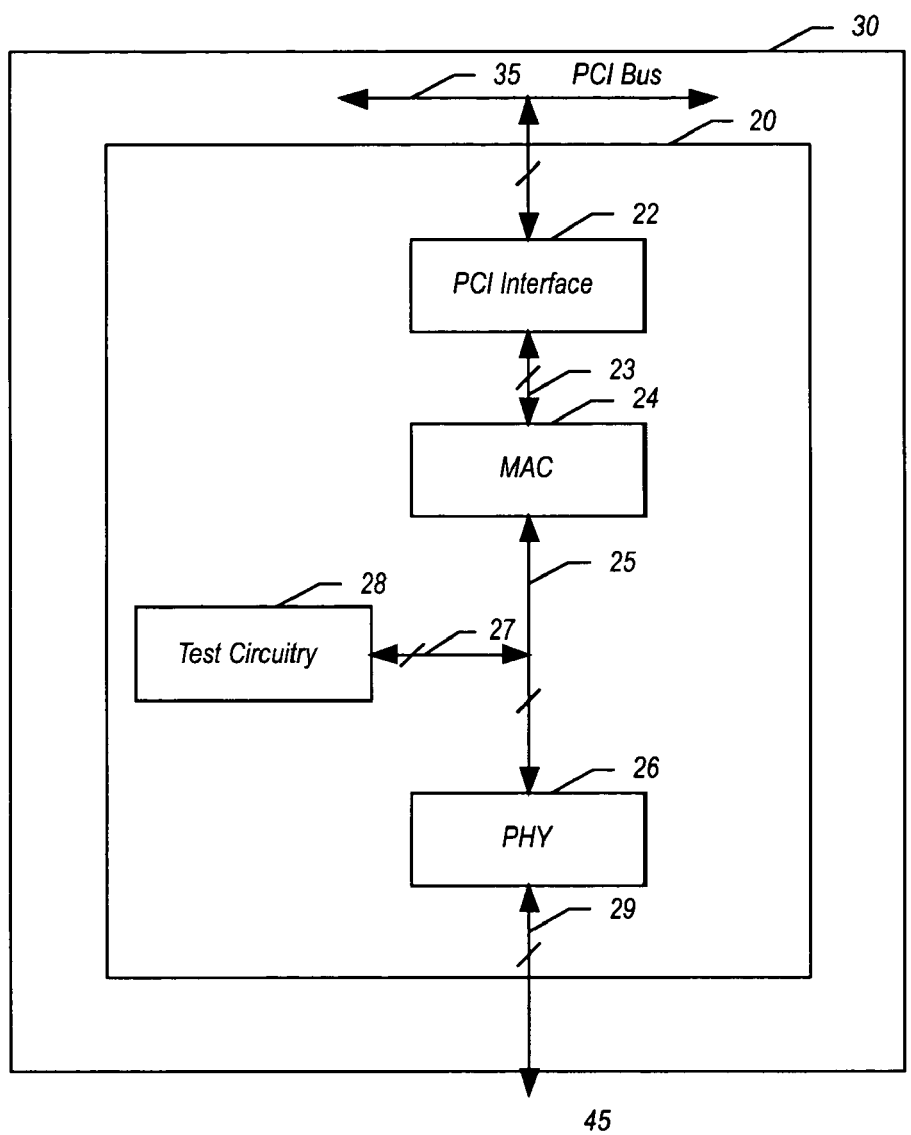
FIG. 2 is a block diagram of a link partner in accordance with one embodiment of the present invention.

Referring now to FIG. 2, shown is a block diagram of a link partner in accordance with one embodiment of the present invention. As shown in FIG. 2, link partner 20 is housed within system 30, and is coupled thereto via a PCI bus 35. While shown in the embodiment of FIG. 2 as being coupled to the PCI bus, it is to be understood that in other embodiments, a link partner may interface with a system via any one of a number of different buses or other communication links. For example, in other embodiments a PCI Express™ bus in accordance with the PCI Express Base Specification, Rev. 1.0 (published Jul. 22, 2002), a communication streaming architecture (CSA) bus, or the like may be used.

Still referring to FIG. 2, link partner 20 may include a PCI interface 22 to interface with PCI bus 35 of system 30. A link 23 couples PCI interface 22 with a MAC unit 24 (hereafter "MAC 24"). MAC 24 may provide medium access control functionality to communicate data across link 45, and may support an Ethernet protocol. MAC 24 may be coupled to a PHY unit 26 (hereafter "PHY 26") via a MII 25. In one embodiment, MII 25 may be a gigabit media independent interface.

A test bus 27 may be coupled to MII 25 to route test data used in channel analysis to test circuitry 28, which may be dedicated circuitry within link partner 20 to perform channel analysis. However, in other embodiments, such channel analysis may be performed using other circuitry within link partner 20 via software or firmware programmed to perform such channel analysis. Similarly, such software and/or firmware may be used to control test circuitry 28 to perform the channel analysis.

In various embodiments, PHY 26 may include various components such as a physical coding sublayer (PCS) for modulation and coding of signals provided by MAC 24, as well as demodulation and decoding of signals received from link 45 via lines 29. Such operations may include a scrambling of data and coding using, for example a Viterbi encoder, and physical circuitry to form and transmit/receive serial data via link 45 according to a given protocol, such as an Ethernet protocol.

In various embodiments, it may be desired to analyze channels within link 45 without link loss. For example, it may be desired to analyze one or more channels within link 45 between system 30 and system 50 (which may be a device under test (DUT)) and obtain various parameters regarding the channel. Such parameters may include, for example, a channel frequency response and a time-domain channel pulse response.

As an example of usage of such channel analysis, an information technology (IT) manager may desire to analyze channels within various links of a network of an enterprise. Such network may include numerous information handling systems, including desktop computers, server computers, storage area networks (SANs), data servers, and the like. Accordingly, the IT manager may access a software program, such as a software driver using, for example, a graphical user interface (GUI) of a device under test. Such a GUI may allow the IT manager to select desired links for testing, as well as one or more channels thereof.

Figure 3:
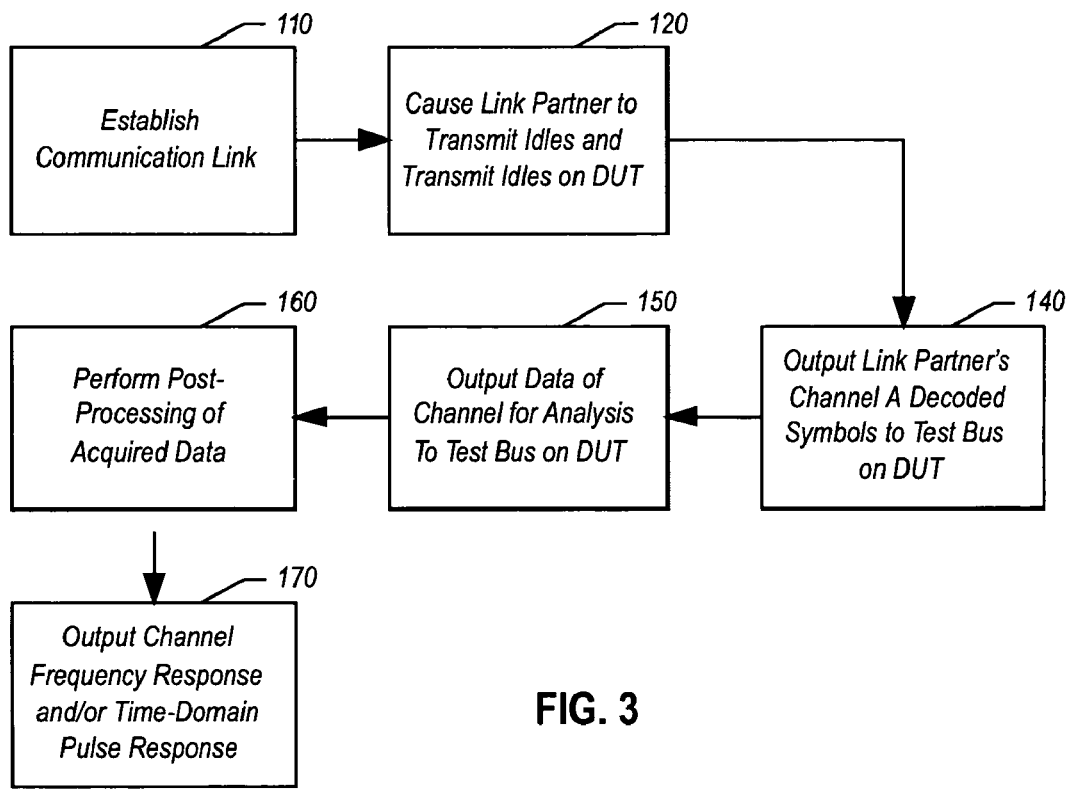
FIG. 3 is a flow diagram of a method in accordance with one embodiment of the present invention.

Referring now to FIG. 3, shown is a flow diagram of a method in accordance with one embodiment of the present invention. As shown in FIG. 3, method 100 may be used to perform channel analysis. First, a communication link is established between two link partners (block 110). As discussed above, such a communication link may be a gigabit Ethernet link, for example. Next, a first one of the link partners (e.g., a remote link partner) may be caused to transmit idle signals (block 120). At the same time, the DUT may itself transmit idle signals along the link. Thus neither link partner transmits system (i.e., non-idle) data during channel analysis, in various embodiments.

While various mechanisms may be used to cause the link partner to transmit such idle signals, in one embodiment, an instruction from the DUT may be sent along the link to cause the remote link partner to transmit idles. In other embodiments, combinations of software, hardware and/or firmware in either the DUT or the remote link partner may be used to initiate such idle signals. Such idle signals may take various forms. For example, in one embodiment such idle signals may be ordered sets in accordance with the IEEE 802.3 standard. Such idle signals are typically used to establish a link with a link partner and maintain it between data transmissions. The signals are not data, but rather are idle messages. That is, idle signals may be a known sequence sent when a link partner is not sending data to another partner.

Decoded idle symbols of a given channel of the link partner may be output to a test bus on the DUT (block 140). For example, a first channel's (e.g., a channel A) decoded symbols from the remote link partner may be sent to a test bus, which may be sent from a MII, for example a gigabit MII (GMIII), and placed into packets. Such packets may thus contain data desired to be analyzed during a channel analysis process. Because a link has been established between the two link partners, the decoded symbols may reflect far-end transmitted symbols with high integrity. These decoded symbols may then be later used as a reference series.

As discussed above, a test bus may be an alternate route from a GMII. Thus, instead of transferring data to a MAC, data may be provided to an alternate processing core, such as a digital signal processor (DSP) or test circuitry (e.g. test circuitry 28), to perform analysis of data from the test bus. Using such test circuitry, data packets may be opened and information extracted therefrom and processed. Thus, at block 140, the decoded symbols from channel A may be output onto the test bus and routed to the test circuitry.

Then data of a channel desired to be analyzed may be output to the test bus on the DUT (block 150). For example, an output of an analog to digital converter (ADC) within PHY 26 that receives data from the desired channel via the communication link may be used to receive analog data across the communication link and convert it into digital data for further processing. This data may be sent to the GMII and placed into packets to be analyzed in test circuitry.

At block 160, post-processing of the acquired data may be performed. While such post-processing may take different forms, one embodiment of such post-processing will be discussed further below. Finally, after such post-processing occurs, various parameters relating to the channel analysis may be output (block 170). For example, in one embodiment frequency response and/or time-domain pulse response information may be output. Such parameters may be output via a user display, such as a graphical user interface (GUI) of the display for review by a user (e.g., an IT manager).

Figure 4:
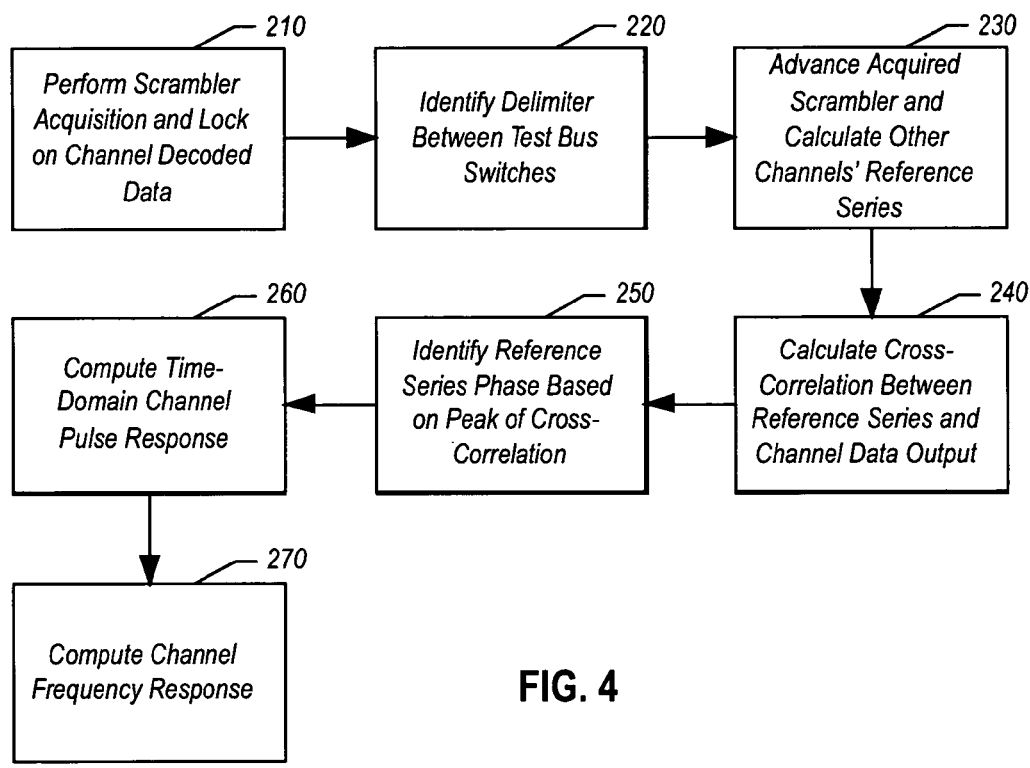
FIG. 4 is a flow diagram of a post-processing method in accordance with one embodiment of the present invention.

Now referring to FIG. 4, shown is a flow diagram of a post-processing method in accordance with one embodiment of the present invention. As shown in FIG. 4, method 200 may begin by performing scrambler acquisition to lock onto the reference series of the decoded symbols from the channel (e.g., of channel A) previously obtained (e.g., from block 140 of FIG. 3). In one embodiment, the scrambler position may be computed and locked using software of an Ethernet controller or other such component by observing the acquired channel reference series. In one embodiment a software scrambler may be implemented to lock onto the reference channel's (i.e., channel A) decoded symbols.

In one embodiment, idle signals may be spread through four channels, namely channels A, B, C and D. In such an embodiment, the channel A idles may be used by the scrambler to compute a reference series to use as a baseline. Then the idle signals sent on channels B through D may have further computations performed thereon. For example, a PCS-like algorithm in the test circuitry may receive decoded signals after decoding in the DSP or test circuitry. The algorithm may then identify which channel is the channel A. After it finds the channel A, it may use at least a portion of the streaming decoded symbols from channel A to identify the other channels. In such manner, a PCS-type algorithm may be mimicked in software to identify channel A and then perform calculations to lock the scrambler on each channel for identification thereof.

For example, at block 220, a delimiter between test bus switches may be identified. Such a delimiter may be a known sequence on the test bus, which may be used to parse data at the point of delimitation. The point of delimitation may be when a switch occurs between different sources being sent on the test bus. For example, at a first time decoded symbol data may be sent (e.g., from channel A), and at a second time analog-to-digital (A/D) data from a given channel (e.g., one of channels B-D) may be sent. In certain embodiments, a known approximate time delay between these different test bus data flows may be present.

The acquired scrambler may then be advanced based on a time difference delay between receipt of the channel A decoded symbols and data from a channel under analysis, which is also received on the test bus. Thus a reference series for the other channel (or channels, if desired) may be calculated (block 230). For example, the scrambler may be advanced from its position set above at block 210, and from its advanced position, a reference series for the channel under analysis may be computed. For example, if a channel B is to be analyzed, a reference series for channel B may be computed. Such a reference series may be determined using the A/D data received from the remote link partner. In such manner, the data represents the far-end transmission, channel parameters, and the analog front end (AFE) of the link partner of the DUT. In one embodiment, the reference series may be a computed idle sequence.

Next, a cross-correlation may be calculated between the reference series determined above (in block 230) and channel data output for the channel under analysis (block 240). For example, the channel data may be obtained in block 150 of FIG. 3 from an ADC for the channel under analysis. Such a cross-correlation may provide an exact timing differential between the reference series and the A/D data. The cross-correlation thus is the relationship as a pulse response of the channel and its AFE components.

Then a reference series phase may be identified based on a peak of the cross-correlation (block 250). For example, a phase relationship between the ADC output and the reference series may be determined based on the peak of the cross-correlation. A time-domain channel pulse response may then be computed (block 260). While such a pulse response may be calculated in various manners, in one embodiment a least-squares computation may be performed. From the pulse response, a channel frequency response may be computed (block 270). In certain embodiments, the frequency response computation may take into account different system components, such as transmit filters, delay circuits, other AFE components, and the like.

After such channel analysis, system data transmission between link partners may be initiated (or resumed) without performing any channel set-up procedures, such as autonegotiation or link convergence.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Figure 5:
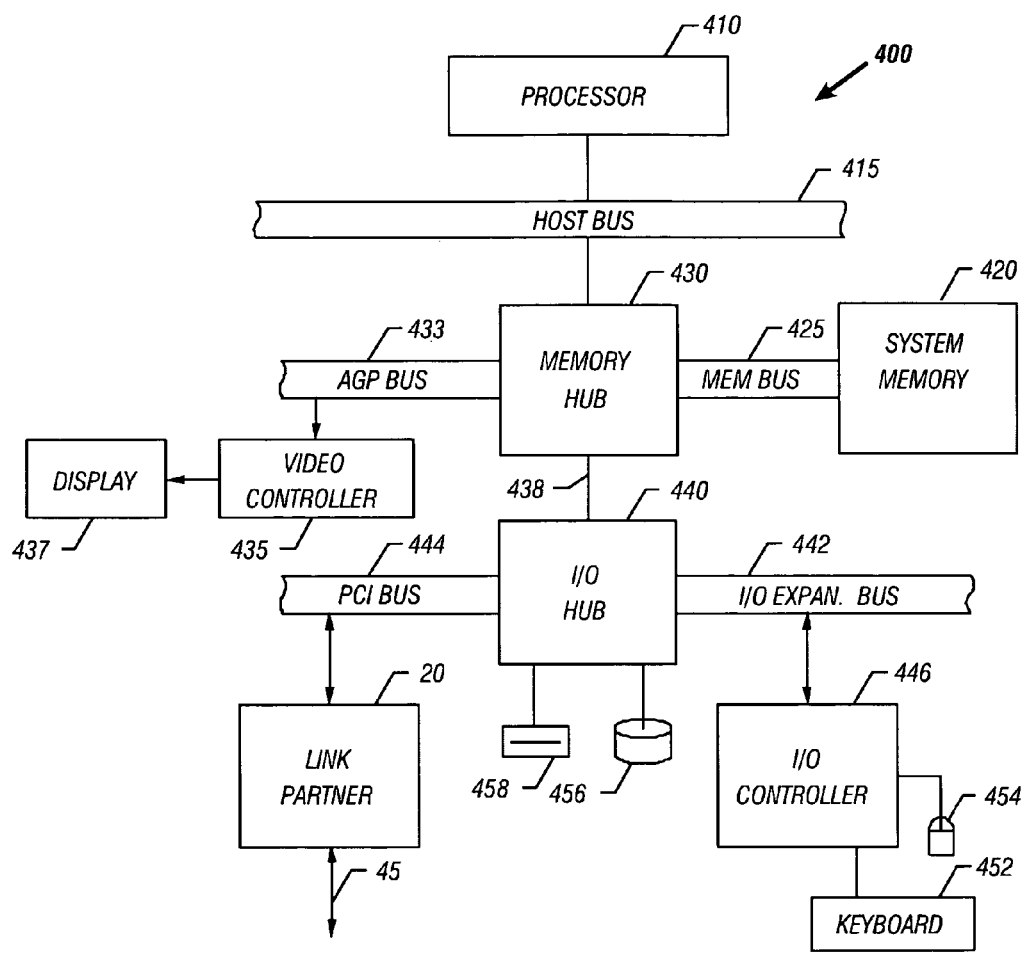
FIG. 5 is a block diagram of a computer system with which an embodiment of the present invention may be used.

Example embodiments may be implemented in software for execution by a suitable system configured with a suitable combination of hardware devices. FIG. 5 is a block diagram of a computer system 400 with which embodiments of the invention may be used.

Now referring to FIG. 5, in one embodiment, computer system 400 includes a processor 410, which may include a general-purpose or special-purpose processor such as a microprocessor, microcontroller, a programmable gate array (PGA), and the like. As used herein, the term "computer system" may refer to any type of processor-based system, such as a desktop computer, a server computer, a laptop computer, or the like.

The processor 410 may be coupled over a host bus 415 to a memory hub 430 in one embodiment, which may be coupled to a system memory 420 (e.g., a dynamic RAM) via a memory bus 425. The memory hub 430 may also be coupled over an Advanced Graphics Port (AGP) bus 433 to a video controller 435, which may be coupled to a display 437. The AGP bus 433 may conform to the Accelerated Graphics Port Interface Specification, Revision 2.0, published May 4, 1998, by Intel Corporation, Santa Clara, Calif.

The memory hub 430 may also be coupled (via a hub link 438) to an input/output (I/O) hub 440 that is coupled to a input/output (I/O) expansion bus 442 and a PCI bus 444. Instead of a PCI bus, a different bus, such as a PCI Express™ bus or a CSA bus may be present. The I/O expansion bus 442 may be coupled to an I/O controller 446 that controls access to one or more I/O devices. As shown in FIG. 5, these devices may include in one embodiment input devices, such as keyboard 452 and mouse 454. The I/O hub 440 may also be coupled to, for example, a hard disk drive 456 and a compact disc (CD) drive 458, as shown in FIG. 5. It is to be understood that other storage media may also be included in the system.

The PCI bus 444 may also be coupled to various components including, for example, a link partner 20 that is coupled to a network port (not shown) to transmit data across a link 45, such as an Ethernet link. Additional devices may be coupled to the I/O expansion bus 442 and the PCI bus 444, such as an input/output control circuit coupled to a parallel port, serial port, a non-volatile memory, and the like. Although the description makes reference to specific components of the system 400, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
maintaining a communication link between a first link partner and a second link partner while analyzing at least one channel of the communication link, the analyzing including performing a scrambler acquisition to lock onto a reference series obtained from decoded transmitted symbols from a first channel of the first link partner, identifying a delimiter between a test bus switch between the decoded transmitted symbols and data from a second channel of the first link partner, computing a reference series for the second channel of the first link partner from the data for the second channel, calculating a cross-correlation between the data for the second channel and the reference series for the second channel, and determining a phase relationship for the second channel between the data and the reference series of the second channel based on a peak of the cross-correlation.

2. The method of claim 1, further comprising preventing the first link partner from transmitting data while analyzing the at least one channel.

3. The method of claim 1, further comprising causing the first link partner to transmit idle signals while analyzing the at least one channel.

4. The method of claim 1, wherein analyzing the at least one channel comprises analyzing a frequency response of the second channel using the phase relationship.

5. A method comprising:
   establishing a communication link between a first link partner and a second link partner;
   causing the first link partner to transmit idle signals; and
   analyzing a desired channel of the communication link using the idle signals, the analyzing including performing a scrambler acquisition to lock onto a reference series obtained from decoded transmitted symbols from a first channel of the first link partner, identifying a delimiter between a test bus switch between the decoded transmitted symbols and data from the desired channel of the first link partner, computing a reference series for the desired channel from the data for the desired channel, calculating a cross-correlation between the data for the desired channel and the reference series for the desired channel, and determining a phase relationship for the desired channel between the data and the reference series of the desired channel based on a peak of the cross-correlation.

6. The method of claim 5, further comprising maintaining the communication link while analyzing the desired channel.

7. The method of claim 5, wherein causing the first link partner to transmit the idle signals comprises sending the idle signals on a reference channel of the communication link.

8. The method of claim 7, further comprising decoding the idle signals to obtain a reference series of the reference channel.

9. The method of claim 8, further comprising using the reference series of the reference channel to obtain a reference series of the desired channel.

10. The method of claim 9, further comprising receiving test data from the desired channel.

11. The method of claim 10, further comprising routing the test data and the reference series of the desired channel over a test bus.

12. The method of claim 9, further comprising locking onto the reference channel with a scrambler.

13. The method of claim 12, further comprising advancing the scrambler to compute the reference series of the desired channel.

14. An apparatus comprising:
   an Ethernet controller including:
      a physical layer unit to transmit and receive information over a link;
      a test bus coupled to the physical layer unit to provide test data of a channel of the link to a test circuit; and
      the test circuit coupled to the test bus to receive the test data therefrom and perform channel analysis using the test data, wherein the test data is received when a link partner coupled to the Ethernet controller is instructed to not transmit data, and the link is maintained during the channel analysis, and wherein the Ethernet controller is to identify a delimiter between a test bus switch between decoded transmitted symbols of a second channel of the link and data for the channel, compute a reference series for the channel, calculate a cross-correlation between the data for the channel and the reference series, and determine a phase relationship for the channel between the data and the reference series for the channel based on a peak of the cross-correlation.

15. The apparatus of claim 14, further comprising a medium independent interface coupled between the test bus and the physical layer unit.

16. The apparatus of claim 15, further comprising a medium access controller coupled to the medium independent interface, wherein the test data is to be provided to the test circuit and not to the medium access controller.

17. The apparatus of claim 14, wherein the apparatus is to cause the link partner to send idle signals during the channel analysis.

18. A system comprising:
   an Ethernet link;
   an Ethernet controller including:
      a physical layer unit to transmit and receive information over the Ethernet link;
      a test bus coupled to the physical layer unit to provide test data of a channel of the Ethernet link to a test circuit; and
      the test circuit coupled to the test bus to receive the test data therefrom and perform channel analysis using the test data, wherein the test data is received when a link partner coupled to the Ethernet controller is instructed to not transmit data, and the Ethernet link is maintained during the channel analysis, and wherein the Ethernet controller is to identify a delimiter between a test bus switch between decoded transmitted symbols of a second channel of the Ethernet link and data for the channel, compute a reference series for the channel, calculate a cross-correlation between the data for the channel and the reference series, and determine a phase relationship for the channel between the data and the reference series for the channel based on a peak of the cross-correlation.

19. The system of claim 18, wherein the Ethernet controller is to cause the link partner to send idle signals during the channel analysis.

20. An article comprising a machine-accessible storage medium containing instructions that if executed enable a system to:
   maintain a communication link between a first link partner and a second link partner while analyzing at least one channel of the communication link, the analyzing including performing a scrambler acquisition to lock onto a reference series obtained from decoded transmitted symbols from a first channel of the first link partner, identifying a delimiter between a test bus switch between the decoded transmitted symbols and data from a second channel of the first link partner, computing a reference series for the second channel of the first link partner from the data for the second channel, calculating a cross-correlation between the data for the second channel and the reference series for the second channel, and determining a phase relationship for the second channel between the data and the reference series for the second channel based on a peak of the cross-correlation.

21. The article of claim 20, further comprising instructions that if executed enable the system to prevent the first link partner from transmitting data while analyzing the at least one channel.

22. The article of claim 20, further comprising instructions that if executed enable the system to cause the first link partner to transmit idle signals while analyzing the at least one channel.

23. The article of claim 20, further comprising instructions that if executed enable the system to resume transmission of system data after the analyzing is completed.

* * * * *